Dec. 24, 1946.  H. C. THOMPSON  2,413,265
TENSION CONTROL DEVICE FOR FLEXIBLE ENDLESS BELTS AND THE LIKE
Filed Jan. 5, 1945

WITNESS
E. B. Bjurstrom

INVENTOR.
HJALMAR C. THOMPSON
BY
ATTORNEYS

Patented Dec. 24, 1946

2,413,265

UNITED STATES PATENT OFFICE 2,413,265

TENSION CONTROL DEVICE FOR FLEXIBLE ENDLESS BELTS AND THE LIKE

Hjalmar C. Thompson, Moline, Ill., assignor to Deere & Company, Moline, Ill., a corporation of Illinois Application January 5, 1945, Serial No. 571,711

6 Claims. (Cl. 198—208)

The present invention relates generally to tension control devices for maintaining tension in endless flexible belts, chains, and the like, and has for its principal object the provision of a novel and improved mechanism for quickly and easily relieving the tension to permit the belt to be repaired or replaced. My invention is particularly well adapted for use with conveyor belts such as, for example, canvas conveyors used extensively in agricultural machines such as harvesters, for conveying grain from the cutter bar to the crop treating housing, although it is to be understood that my invention is not limited to any particular application.

A more specific object of my invention has to do with the provision of a novel and improved locking mechanism for shifting the supporting bearing of a conveyor roller or the like into a belt-loosening position and retaining it in that position, utilizing the pressure of the belt tightening spring for holding the mechanism in locked position.

These and other objects and advantages of my invention will be apparent to those skilled in the art after a consideration of the following description, in which reference is had to the drawing appended hereto, in which Figure 1 is a fragmentary plan view of a device embodying the principles of my invention, shown in operating or belt-tightening position.

Figure 1:
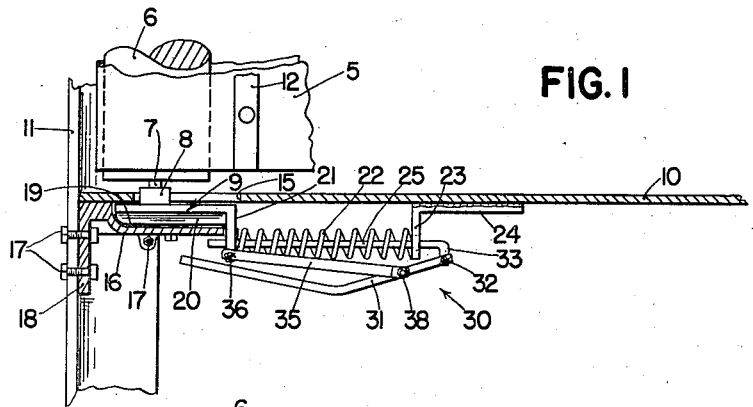

Referring now to the drawing, reference numeral 5 indicates a fragmentary portion of a flexible endless belt, such as the platform canvas of a combine or other harvester. The belt 5 is trained over a roller 6, which is mounted on a supporting shaft 7 journaled in a bearing sleeve 8 of a bearing member 9. The roller 6 is represented as the front roller of a harvester platform conveyor, mounted between the side walls of the harvester platform, one of which side walls is indicated by reference numeral 10, immediately behind the main transverse frame member 11 at the forward end of the harvester platform. Reference numeral 12 indicates a portion of one of the slats on the platform canvas 5.

The bearing member 9 is disposed on the outer side of the sidewall 10, which is provided with a longitudinally extending slot 15, through which the supporting shaft 7 and journal bearing sleeve 8 extend, and the bearing member 9 is slidably mounted on the outside of the wall 10 in a guide casting 16 which is secured by bolts 17 to the main frame member 11, the casting 16 being provided with a supporting flange 18 through which the bolts 17 extend. The casting 16 is provided with a longitudinally extending groove 19 which receives a cooperative ridge 20, which permits the bearing member 9 to slide longitudinally of the platform wall 10 but prevents the bearing member 9 from twisting or turning.

The rear end of the bearing member 9 is provided with an outwardly turned flange 21, which serves as an abutment for a helical compression spring 22, the rear end of the latter being disposed to bear against a stationary abutment in the form of a flange 23 which is part of a bracket 24 welded to the side wall 10 and is disposed substantially parallel to, and in fore and aft alignment with the flange 21 on the bearing member 9. A guide rod 25 extends axially through the spring 22 and through a pair of aligned apertures in the abutments 21, 23, and serves the purpose of retaining the helical spring 22 between the two abutments 21, 23.

Normally, the spring 22 is stressed in compression to urge the bearing member 9, the shaft 7, and the roller 6 forwardly, or to the left as viewed in the drawing, to maintain a pressure against the belt 5 to hold the latter tight during operation. However, it is frequently desirable to relieve the tension from the belt 5 when the belt is not in use and when it is necessary to repair or replace the belt.

The pressure of the spring 22 is relieved from the belt by means of a spring disabling toggle device indicated in its entirety by reference numeral 30 and which includes a lever 31 pivotally connected by a pivot bolt 32 to the outwardly turned rear end 33 of the guide rod 25. The lever 31 is connected by a link member in the form of a pair of vertically spaced straps 35 to the bearing member 9, at the outer end of the laterally extending flange portion 21. The latter is provided with a vertical pivot 36 to which the forward ends of the straps 35 are pivotally connected at their forward ends, the rear ends of the straps being turned inwardly and rearwardly to form a pair of vertically spaced connecting portions 37 pivotally secured to the lever 31 by a pivot bolt 38. The bolt 38 is inserted through aligned apertures in the rear ends of the straps 35 and through the lever 31 at a point spaced outwardly from the fulcrum pivot 32.

Figure 2:
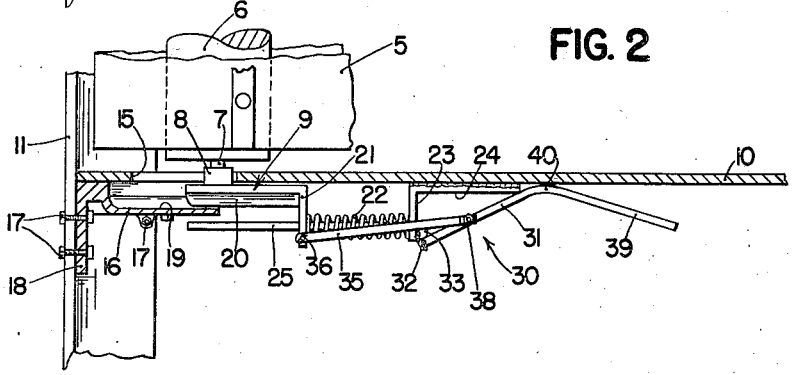
Figure 2 is a view similar to that in Figure 1 but showing the mechanism in a tension-releasing or belt-loosening position.
Figure 3:
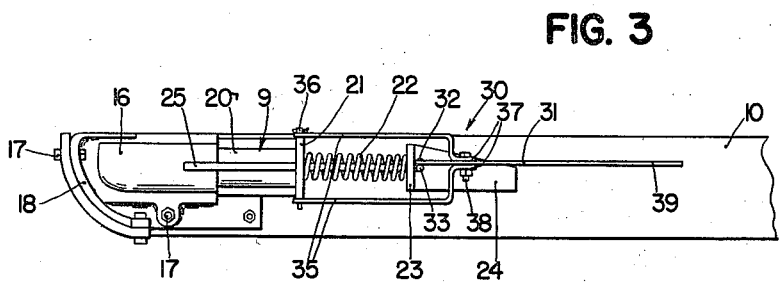
Figure 3 is a side elevational view of the device shown in the position of Figure 2.

Normally, the lever 31 is disposed in a forwardly extending position as shown in Figure 1, positioning the outwardly turned end portion 33 of the guide rod 25 in a rearwardly spaced relation to the abutment 23. This permits the spring 22 to exert a forwardly directed force against the flange 21, reacting against the abutment 23 and is stressed in compression to urge the bearing member 9 forwardly against the end loop of the belt 5 holding the latter in tension. The belt is slackened by swinging the lever 31 rearwardly about the fulcrum pivot 32, first shifting the rod 25 forwardly until the end portion 33 bears against the rear of the abutment ear 23, after which further rearward swinging movement of the lever 31 pulls the link member 35 rearwardly, thereby shifting the bearing member 9 rearwardly against the compression of the spring 22, further compressing the latter between the abutments 21 and 23. Rearward movement of the lever 31 swings the pivot bolt 38 rearwardly of the pivot bolt 32, through a dead-center relation between the link straps 35 and the lever 31, in which they are in substantially parallel relation with the three pivot bolts 32, 36 and 38 in fore and aft alignment. The lever 31 is bent to form a rear handle portion 39 and a knee portion 40 which engages the side wall 10 to stop the lever 31 in a position in which the pivot bolt 38 is inwardly of a straight line intersecting the axes of the pivots 32, 36. Thus, the lever 31 and link member 35 act as a pair of toggle links to lock the bearing member 9 in a rearward non-operating position in which the roller 6 is moved rearwardly from the end of the belt 5, leaving the latter slack. In this position, as shown in Figures 2 and 3, the force of the spring 22 tends to urge the bearing member 9 and link member 35 forwardly, exerting a pull against the lever 31 urging the knee 40 against the wall 10.

To restore the roller 6 to operating position, the operator grasps the handle 39 and swings it outwardly about the pivot bolt 32 until the interconnecting bolt 38 passes outwardly over dead-center relation between the toggle links 31, 35, after which the spring 22 is free to force the bearing member 9 forwardly within its slide or groove 19, into engagement with the belt 5. Thus, it is evident that the tensioning device provides a simple and effective means for quickly and easily applying and releasing the tension in the conveyor belt 5.

I claim:

1. A tension control device for flexible endless conveyors and the like, comprising in combination, a bearing member, a support therefor providing for shifting movement of said bearing member, spring means reacting against said support urging said bearing member in one direction, a pair of toggle links pivotally connected together, means connecting said links between said bearing member and said support, said links being swingable from a relaxed position, in which said bearing is controlled by the pressure of said spring, through a dead-center position in which the major axes of said links are substantially parallel, to a locked position in which said bearing is shifted in the opposite direction against the force of said spring means to a non-operating position, and abutment means engageable by said links against which the latter are retained by the force of said spring means in said locked position.

2. A tension control device for flexible endless conveyors and the like, comprising in combination a support, a bearing member slidably mounted thereon, spring means connected between said support and said bearing member for urging the latter in one direction, and spring disabling means connected between said support and said member and including a pair of pivotally interconnected toggle links, said links being normally disposed with their interconnecting pivot on one side of a straight line extending between the opposite ends of said links and free to swing angularly to permit sliding movement of said member on said support, manually operable means for swinging said links through a dead-center relation to a non-operating position in which the interconnecting pivot is on the other side of said line, to shift said bearing member in the opposite direction against the pressure of said spring means, and stop means for limiting the movement of said links to lock the latter in said non-operating position.

3. A tension control device for flexible endless belts and the like, comprising in combination, a support, a bearing member slidably mounted thereon, a helical spring disposed to act in compression between abutments on said support and said member for urging the latter in a belt tightening direction, and spring disabling means connected between said support and said member on opposite sides of said spring and including a pair of pivotally interconnected toggle links, said links being normally disposed with their interconnecting pivot on one side of a straight line extending between the opposite ends of said links and free to swing relative to each other and permitting sliding movement of said bearing member on said support, manually operable means for swinging said links through a dead-center relation to a non-operating position in which the interconnecting pivot is on the other side of said line, to shift said bearing member in a belt-loosening direction against the compression force of said spring, and stop means for limiting the movement of said links to lock the latter in said non-operating position.

4. A tension control device for flexible endless belts and the like, comprising in combination, a support, a bearing member slidably mounted thereon, a helical spring disposed to act in compression between abutments on said support and said member for urging the latter in a belt tightening direction, a guide rod extending axially through said spring and through aligned apertures in said abutments, a pair of toggle links pivotally connected to one of said abutments and to said guide rod on its projection beyond the other of said abutments, respectively, manually actuated means for swinging said links through a dead-center position to compress said spring, and stop means to limit the movement of said links beyond said dead-center position to lock said spring in compressed condition.

5. A tension control device for flexible endless belts and the like, comprising in combination, a support, a bearing member slidably mounted thereon, a helical spring disposed to act in compression between abutments on said support and said member for urging the latter in a belt tightening direction, a lever supported on one of said abutments, a link having means establishing an operative connection with the other of said abutments and connected to said lever by pivot means spaced from the fulcrum point of said lever, the latter being swingable in one direction to draw said abutments together to compress said spring, and stop means for limiting the movement of said lever in said one direction at a locked position in which the pressure of said spring acts through said link to urge said lever against said stop means.

6. A tension control device for flexible endless belts and the like, comprising in combination, a support, a bearing member slidably mounted thereon, an abutment on said bearing member, an abutment on said support disposed in alignment with said first abutment, a helical spring disposed between said abutments and normally stressed in compression to urge said abutments apart, a guide rod extending axially through said spring and through aligned apertures in said abutments, a lever pivotally connected to said rod on the outer side of one of said abutments, a link pivotally connected to the other of said abutments and pivotally connected to said lever at a point spaced from its pivotal connection with said rod, said lever being normally disposed in a position in which the pivot connections of said lever and link are spread apart to permit said spring to urge said bearing toward a belt tightening position and swingable in one direction to draw said abutments together to compress said spring toward a belt-loosening position, and stop means for limiting the movement of said lever in said one direction after said link has swung over the pivotal connection of said lever with said rod, whereby the pressure of said spring acts through said link to hold said lever against said stop means.

HJALMAR C. THOMPSON.